Figure 1:
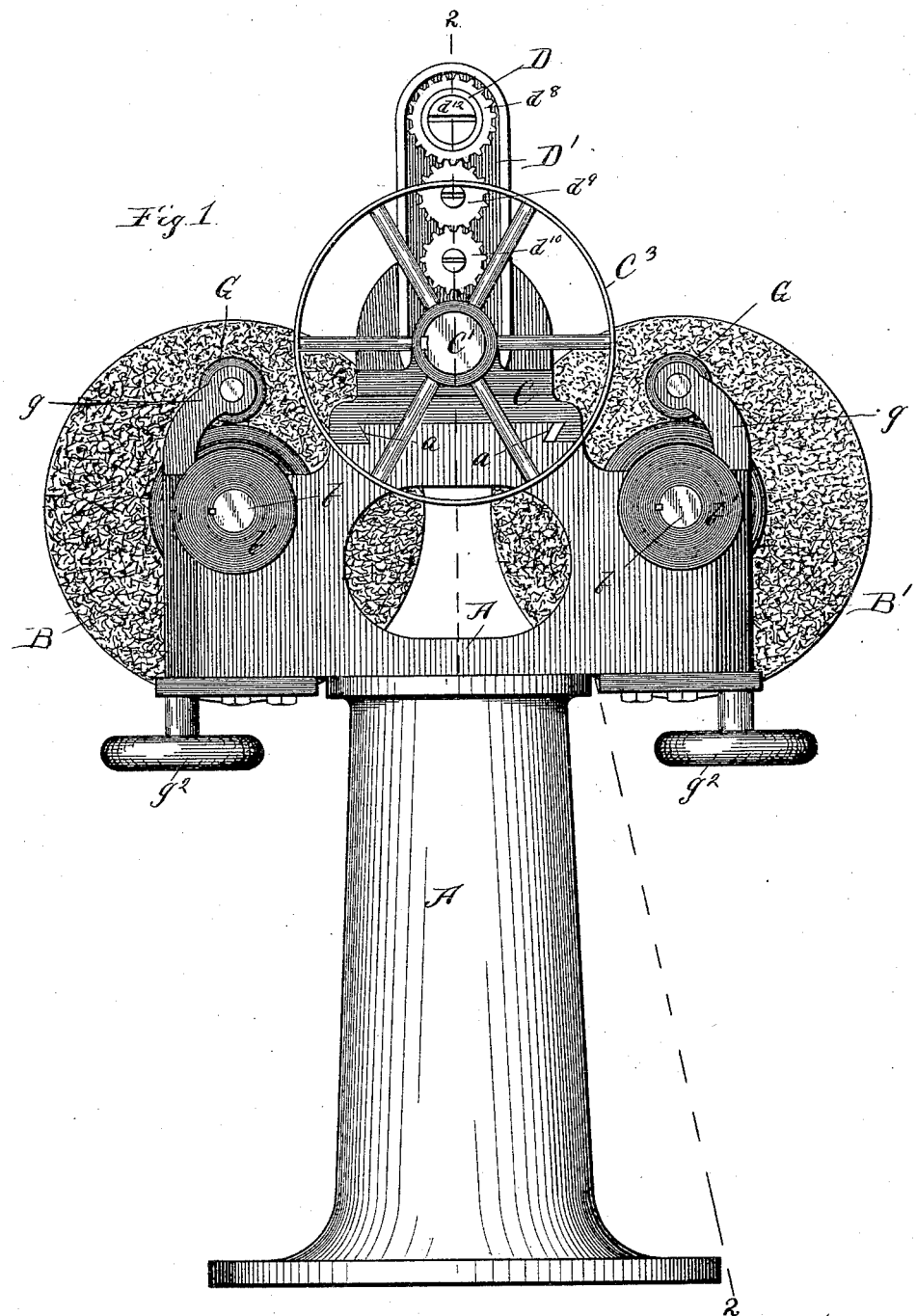

(No Model.) 3 Sheets—Sheet 3.
A. JOHNSTON.
MACHINE FOR GRINDING CUTLERY HANDLES.
No. 433,526. Patented Aug. 5, 1890.
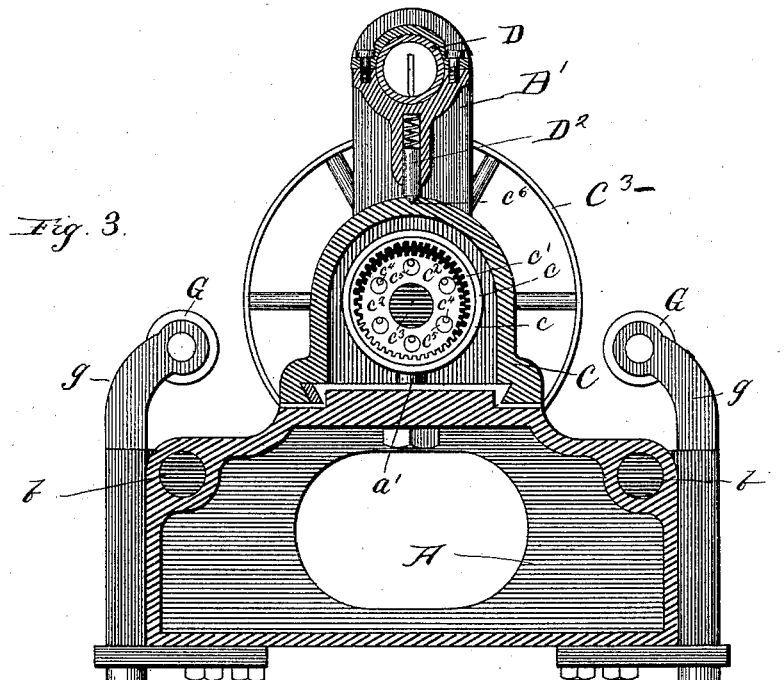
Fig. 3.
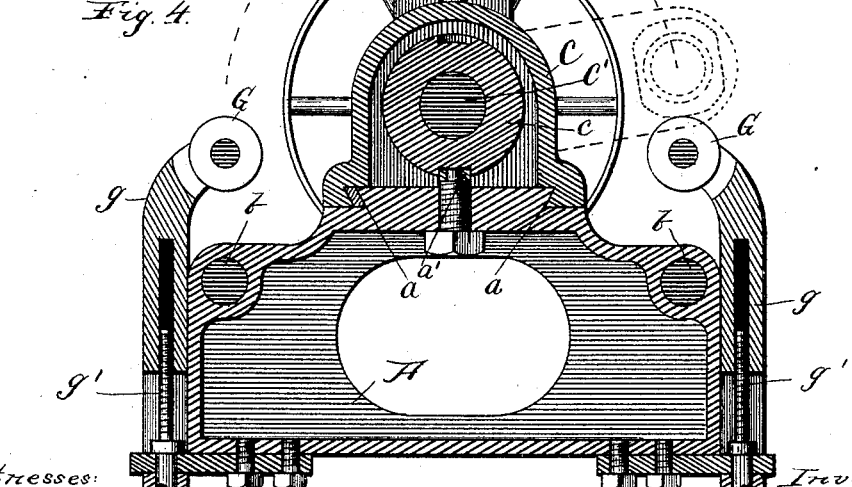
Fig. 4.
Witnesses:
Geo. E. Curtis
John Carlson
Inventor:
Allen Johnston
By Munday, Evarts & Adcock
his Attorneys.

UNITED STATES PATENT OFFICE.

ALLEN JOHNSTON, OF OTTUMWA, IOWA.

MACHINE FOR GRINDING CUTLERY-HANDLES.

SPECIFICATION forming part of Letters Patent No. 433,526, dated August 5, 1890.

Application filed May 4, 1888. Serial No. 272,767. (No model.)

*To all whom it may concern:*

Be it known that I, ALLEN JOHNSTON, a citizen of the United States, residing in Ottumwa, in the county of Wapello and State of Iowa, have invented a new and useful Improvement in Machines for Grinding Cutlery-Handles, of which the following is a specification.

My invention relates to grinding-machines, and is specially designed for grinding cutlery (knife and fork) handles.

Heretofore the handles for knives and forks have usually been ground by hand—that is to say, the knife or fork handle has been held against the grinding-wheel by hand, thus requiring skilled labor and rendering the grinding operation both slow and expensive, and even with skilled labor the handles cannot be ground to true and uniform shape. The shape of these handles is either oval or irregular in cross-section, and they generally taper more or less longitudinally.

By my invention I produce an automatic machine, by means of which such handles may be rapidly and cheaply ground, and to any desired shape, and the separate handles may be ground with uniformity.

My invention consists, in connection with a revolving grinder or stone, of a revolving holder for holding the knife-handle to be ground, and suitable means for causing the axes of the grinder and work-holder to approach and recede from each other as the holder revolves. The lateral motion to bring the axes of the grinder and holder closer together and farther apart may preferably be given to the revolving holder, owing to the greater weight and rapidity of motion of the grinder.

The invention also consists, in connection with such revolving and laterally-moving holder, of means for giving the revolving holder a longitudinally-reciprocating movement to bring each part of the work in contact with the grinder and thus also secure uniform wear across the whole peripheral face of the stone or grinder.

It also consists in the combination, with such revolving longitudinally and laterally moving work-holder and the revolving grinder, of a revolving former, corresponding in shape to the handle to be ground, for regulating or giving to the work-holder its lateral movement to and from the grinder. This former operates in conjunction with a suitable guide, support, or rest, against which the surface of the revolving former comes in contact when it revolves.

It also consists, in connection with the revolving and laterally-moving work-holder and its revolving former, of two grinding-wheels arranged one on each side thereof, so that the same shape may be given to the handle by both grinding-wheels, and the handle be ground first on one wheel and then on the other without removing it from the holder. One of these grinding-wheels should be finer than the other, and is used for finishing the handle after it is roughly ground on the first grinding-wheel.

It also consists in the novel devices and novel construction of parts and devices herein shown and described, and more particularly pointed out in the claims.

Figure 2:
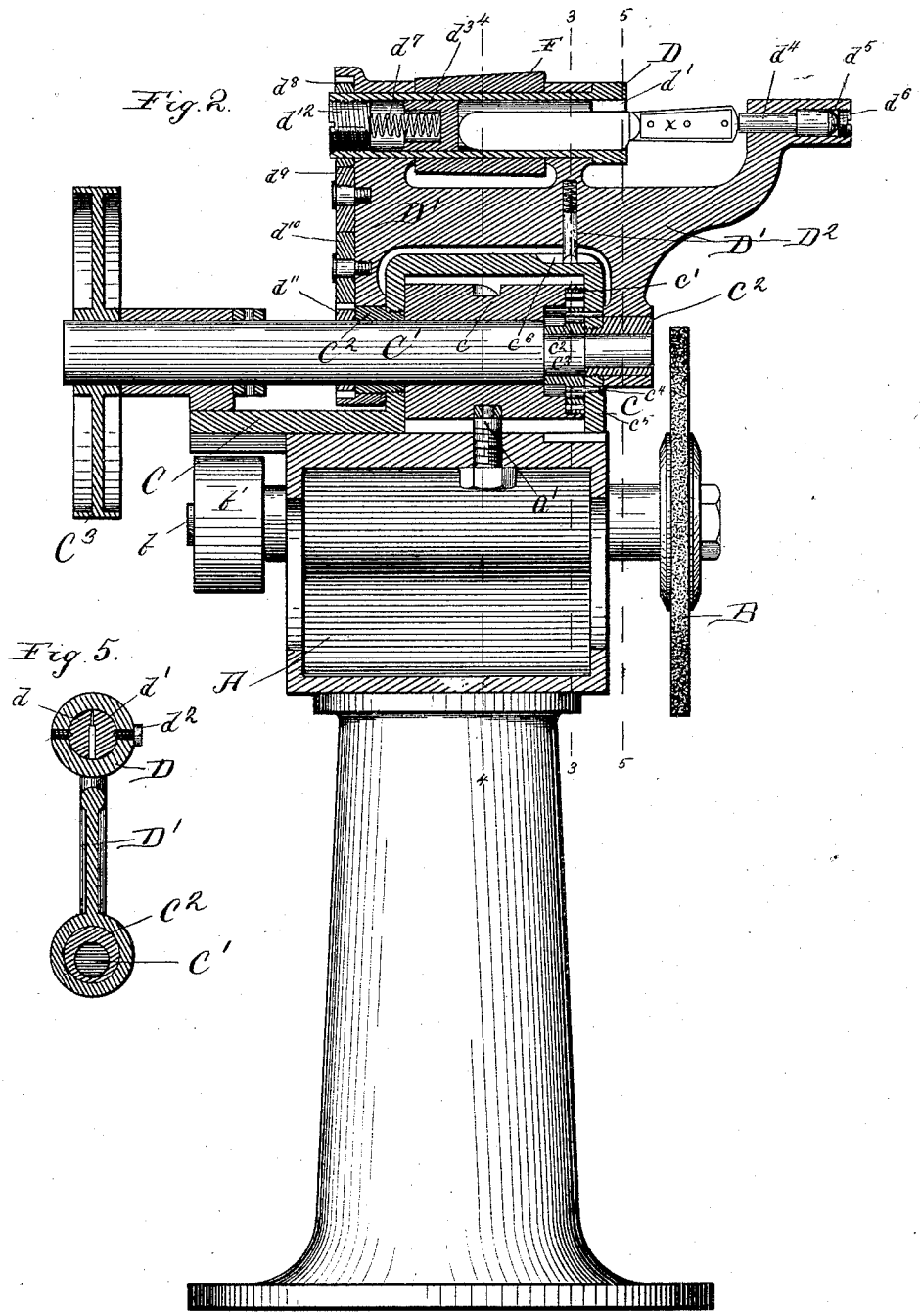

In the accompanying drawings, which form a part of this specification, and in which similar letters of reference indicate like parts, Figure 1 is an end view of a machine embodying my invention. Fig. 2 is a vertical longitudinal section on line 2 2 of Fig. 1. Figs. 3, 4, and 5 are cross-sections on lines 3 3, 4 4, and 5 5, respectively, of Fig. 2.

In said drawings, A represents the frame of the machine, which may be of any suitable construction to give a proper bearing and support to the working parts.

B B' are a pair of revolving grinders or stones, preferably emery stones. Their shafts *b* are journaled in suitable bearings on the frame of the machine, each shaft being preferably provided with a separate pulley *b'*, so that they may be independently and separately driven by suitable belts from the counter-shaft or source of power. The grinder B' should be of finer grit than the stone B and may be termed the "finishing-wheel," while the other stone B serves to grind the article more rapidly and roughly.

C is a reciprocating slide or frame mounted in suitable guides *a* on the main frame, so that it may reciprocate longitudinally or parallel to the axes of the grinders B B' and revolving work-holder D. The work-holder is journaled on a laterally-moving frame D'. The lateral movement of the frame D' and the work-holder D, journaled thereon, so as to bring the axes of the work-holder and the grinder nearer together or farther apart, as desired, may be given in any suitable way, but preferably by swinging it laterally on pivots.

The revolving holder D is furnished with a suitable socket $d$ to receive the blade or end of the knife to be ground. The socket-piece $d$ is preferably made with a movable or adjustable part $d'$, furnished with a set-screw $d^2$, so that it may be adjusted to receive the knife blade or shank. The work-holder is also furnished with an adjustable spring end piece $d^3$, to bear against the end of the knife-blade and force the opposite end of the knife-handle against the revoluble support or pin $d^4$, which is journaled on the frame D'. This pin or support $d^4$ should have a slight depression or socket to receive the projecting end, which in practice I leave at the end of the handle, or there may be formed a slight depression in the handle and a corresponding projection on the revolving pin $d^4$, so as to give adequate support to the outer end of the handle. The pin $d^4$ is furnished with a rounded head $d^5$, and is held in place by set-screw $d^6$. The sliding end piece $d^3$ has a spring $d^7$, which bears against a set-screw $d^{12}$ in the end of the work-holder tube D.

The frame or slide C is given its longitudinal movement by means of the grooved cam $c$ on the shaft C' engaging a stud or pin $a'$ on the frame A. The cam $c$ is caused to revolve slowly on the shaft C' by means of an interior gear $c'$ cut on the projecting rim of the cam-wheel $c$, which engages a smaller non-revolving gear $c^2$, journaled on an eccentric portion $c^3$ of the shaft C'. The gear $c^2$ is held from revolving, but permitted to move eccentrically by means of the pins $c^4$, secured to the frame or slide C, and which fit in holes $c^5$ in the gear $c^2$. This is an ordinary form of reducing-gear, and serves to revolve the cam $c$ slowly in respect to the revolution of the shaft C' and the work-holder D, driven from such shaft.

The work-holder D is revolved or driven by a gear $d^8$ thereon, which, through the intermediate gears $d^9$ $d^{10}$, meshes with the gear $d^{11}$, secured to the shaft C'. The swinging frame D' is pivoted to the slide C or the shaft C', journaled thereon through the eccentric collars $C^2$ $C^2$, so that when the swinging frame D' is turned to the vertical position, as indicated in Fig. 2, for example, the gear $d^{10}$ will be raised out of engagement with the gear $d^{11}$ on the shaft C', while said gears will be in engagement when the swinging frame D' is swung to the right or left into position for operation. This permits the work-holder D to cease revolving when it is lifted into this vertical or intermediate position, so that the finished handle can be conveniently taken out of the work-holder and replaced by another to be ground. For convenience of holding the frame D' in the vertical position, I provide the same with a spring pin or latch $D^2$, which engages a suitable recess $c^6$ in the frame C.

F is the revolving former, corresponding in shape to the handle $x$ to be ground. This revolving former is preferably secured directly to the holder-sleeve D, so that it will revolve therewith. The former F not only corresponds to the handle $x$ in cross-section, but also in longitudinal section, having the same taper or shape in every direction.

G G are the rests or guides upon which the former F rests while it revolves. These rests G are preferably revolving rollers to diminish the friction, and they are journaled each on adjustable standards $g$, so that the position of the guides or rests G G may be adjusted to correspond to the wear of the stones or grinders B B'. The adjusting-screws $g'$ are furnished with suitable handles $g^2$.

In operation a knife or fork the handle of which is to be ground is first placed in the revolving holder D, and then, the rests G G being properly adjusted, the swinging frame D' is first swung down on one side until the handle is ground by the rougher stone and then the frame D' is swung to the other side and the handle is ground by the finer stone. When this is done, the frame D' is turned to its middle or vertical position and there held while the ground article is being taken out and replaced by another. The shaft C' is preferably furnished with a separate driving-pulley $C^3$, as it is of course driven much slower than the revolving grinders B B'.

I have herein shown and described that which I believe to be the preferable means or mechanism for communicating to the various parts their required motions; but it will be understood that these motion-giving parts may be greatly varied by the skilled mechanic without departing from my invention.

I claim—

1. In a cutlery-handle-grinding machine, the combination, with a revolving work-holder D, provided with a socket $d$, adapted to receive the blade of the knife, of a swinging or laterally moving frame D', upon which said work-holder is journaled, a longitudinally-reciprocating slide C, carrying said frame D', a revolving former F, rest G, and a revolving grinder B, substantially as specified.

2. In a cutlery-handle-grinding machine, the combination, with a work-holder D, provided with a socket $d$ to receive the blade of the knife, a spring-support $d^3$, adapted to bear against the end of the knife-blade, and an opposing revoluble pin or support $d^4$, of a laterally-moving frame D', upon which said revolving work-holder is journaled, a reciprocating slide, former F, rest or guide G, and revolving grinder B, substantially as specified.

3. The combination, with frame A, revolving grinder B, reciprocating slide C, shaft C', journaled thereon, cam $c$, and pin $a'$, of a swinging frame D', pivoted to said slide, revolving knife-holder D, journaled in said frame, former F, secured to said work-holder, and rest G; substantially as specified.

4. The combination, with two revolving grinders, of a slide C, reciprocating longitudinally between said grinders, a work-holder frame D', pivoted to said slide C, and a revolving work-holder D, journaled on said frame D', substantially as specified.

5. The combination, with two revolving grinders, of a slide C, reciprocating longitudinally between said grinders, a work-holder frame D', pivoted to said slide C, and a revolving work-holder D, journaled on said frame D', former F, and rests G G, substantially as specified.

6. The combination, with two revolving grinders, of a slide C, reciprocating longitudinally between said grinders, a work-holder frame D', pivoted to said slide C, and a revolving work-holder D, journaled on said frame D', former F, and rests G G, said swinging frame D having eccentric pivots, substantially as specified.

7. The combination of a revolving grinder, with longitudinal slide C, shaft C', journaled thereon, swinging frame D', work-holder D, having a gear driven from a gear on said shaft C', the pivot of said work-holder frame D' being eccentric to said shaft C', so that when the frame D' is raised to move the work out of contact with the grinder the revolving holder D will be disengaged from its driving-gear on said shaft C', substantially as specified.

8. In a grinding-machine, the combination, with a revolving holder adapted to hold a knife or fork by the blade or part near the handle and provided with a socket to receive the blade, and a rest or support at the outer end of the handle to hold it in line against the pressure of the grinding-wheel, and a spring for forcing and holding together by a yielding pressure the opposing parts of said holder between which the knife is grasped, of a revolving grinding-wheel, a former, and a rest to give the holder motion to and from the grinding-wheel at each revolution of said holder, substantially as specified.

9. In a grinding-machine, a swinging frame carrying a holder to hold the article to be ground, in combination with driving mechanism for revolving said holder, the swinging movement of said frame engaging and disengaging the revolving holder with its driving gears or mechanism, so that the holder will revolve while in contact with the grinding-wheel and will cease to revolve when brought to the proper position for removing the article after it is ground, substantially as specified.

ALLEN JOHNSTON

Witnesses:
J. T. HACKWORTH,
A. G. HARROW.